(12) United States Patent
Terno et al.

(10) Patent No.: US 7,695,065 B2
(45) Date of Patent: Apr. 13, 2010

(54) SEAT, ESPECIALLY AN AIRCRAFT PASSENGER SEAT, WITH A DATA STORAGE DEVICE AND ASSOCIATED READING DEVICE

(75) Inventors: Antje Terno, Michelbach (DE); Christoph Schrempp, Vellberg (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 732 days.

(21) Appl. No.: 10/565,943

(22) PCT Filed: Jul. 23, 2004

(86) PCT No.: PCT/EP2004/008228

§ 371 (c)(1),
(2), (4) Date: Jan. 26, 2006

(87) PCT Pub. No.: WO2005/011439

PCT Pub. Date: Feb. 10, 2005

(65) Prior Publication Data

US 2006/0186714 A1    Aug. 24, 2006

(30) Foreign Application Priority Data

Jul. 29, 2003    (DE) ................ 103 34 462

(51) Int. Cl.
*A47C 31/12* (2006.01)
*A47C 7/62* (2006.01)
(52) U.S. Cl. .................................. 297/217.3
(58) Field of Classification Search .......... 297/217.3, 297/463.2, 217.1; 244/118.6, 122 R
See application file for complete search history.

(56) References Cited

U.S. PATENT DOCUMENTS

| 5,490,710 A | * | 2/1996 | Dearing et al. ............. 297/162 |
| 6,102,476 A | * | 8/2000 | May et al. ................ 297/217.3 |
| 6,107,920 A | | 8/2000 | Eberhardt |
| 6,412,813 B1 | * | 7/2002 | Breed et al. ................ 280/735 |

(Continued)

FOREIGN PATENT DOCUMENTS

DE    198 36 969 A1    2/2000

(Continued)

OTHER PUBLICATIONS

European Patent Office Action dated Jul. 12, 2007 for corresponding European Application No. 04 763 420.9-2422.

(Continued)

*Primary Examiner*—Milton Nelson, Jr.
(74) *Attorney, Agent, or Firm*—Posz Law Group, PLC

(57) ABSTRACT

The invention relates to a seat, especially a vehicle seat, preferably an aircraft passenger seat (10, 30), comprising at least one seat component, such as a seat part (20), a backrest (22) or an armrest (26). As delivered, the seat meets predefined approved requirements and is correspondingly certified. The inventive seat is characterized in that a data storage device is fixedly disposed on at least one seat component. Said data storage device is used to store individual data relating to the service life or certification of the respective seat and/or individual seat components. The inventive seat is further characterized in that the data storage device can be electronically read by an external reading device. The invention also relates to an associated reading device.

9 Claims, 2 Drawing Sheets

U.S. PATENT DOCUMENTS

Figure 1:
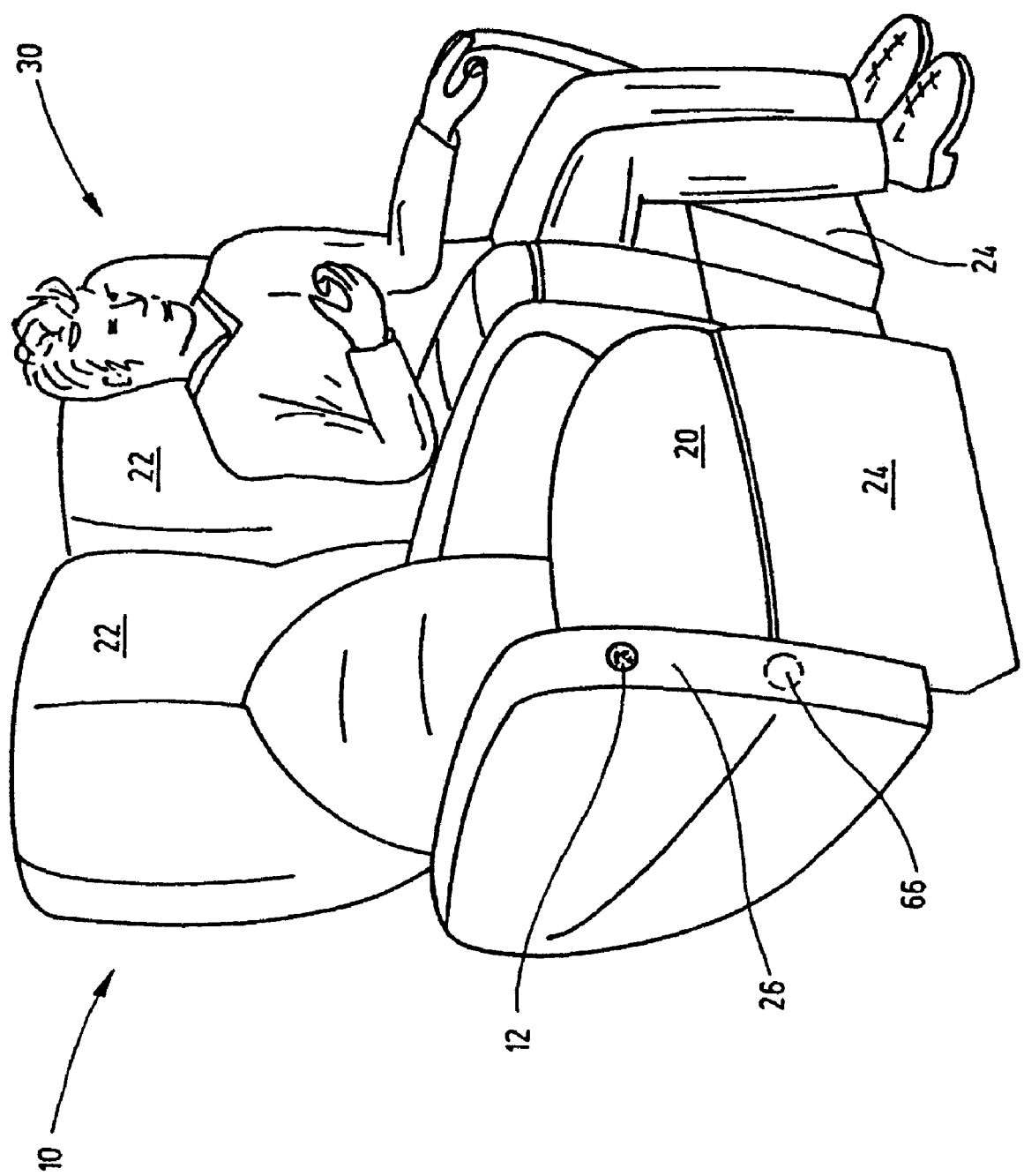

| | | |
|---|---|---|
| 6,473,704 B1 | 10/2002 | Ito et al. |
| 6,561,580 B1 | 5/2003 | Bergey |
| 6,888,462 B2 * | 5/2005 | Brodine .................... 340/568.1 |
| 6,982,653 B2 * | 1/2006 | Voeller et al. ................ 340/933 |
| 7,047,159 B2 * | 5/2006 | Muehl et al. ................. 702/184 |
| 2002/0080032 A1 * | 6/2002 | Smith et al. .............. 340/572.1 |

FOREIGN PATENT DOCUMENTS

| | | |
|---|---|---|
| DE | 198 40 785 A1 | 3/2000 |
| DE | 199 50 554 | 4/2001 |
| DE | 101 47 043 | 3/2003 |
| DE | 101 45 498 | 4/2003 |
| EP | 1 462 349 A1 | 9/2004 |
| WO | WO 97/22297 | 6/1997 |

OTHER PUBLICATIONS

XP-002304960 Federal Aviation Regulation Sec 23.1301, effective Sep. 1, 1977.

* cited by examiner

SEAT, ESPECIALLY AN AIRCRAFT PASSENGER SEAT, WITH A DATA STORAGE DEVICE AND ASSOCIATED READING DEVICE

The invention relates to a passenger seat, especially a vehicle seat, preferably an aircraft passenger seat, as claimed in the preamble of claim 1, and an associated reading device for transmission of data to the data storage device of the seat.

In certain areas of application high requirements are set for seats with respect to specific properties such as mechanical strength, refractability, or the like. This applies especially to vehicle seats and preeminently to aircraft passenger seats. The seat as a whole or individual seat components must comply with specified approval regulations and accordingly be certified. Manufacturers of such seats guarantee compliance with the requirements and must guarantee this for a prescribed period. For a variety of reasons a seat, even an individual seat component, often undergoes modification, such as change in the location of use, type of use, or frequency of use, or replacement of seat components because of damage or wear.

In the past it has not been possible to acquire relevant data relating to the service life and/or certification of a particular seat and/or individual seat components. There are accordingly no actual values determined in practical applications which are available, for example, for the MTBF (mean time between failures). In addition, it has not been possible reliably to identify uncertified and thus unapproved replacement parts in every case.

DE 199 50 554 A1 discloses a process for operation of a product information system for administration of product-specific information, along with a corresponding system under which production, transportation, and storage data from manufacturer to distributor are stored in a transponder having a storage unit and energy source and the transponder is in the form of adhesive labels or labels in the form of cards.

DE 101 47 043 A1 discloses a process for acquisition of data for locating and inventorying pieces of furniture in a building. The building is catalogued by floors and by rooms on individual floors, so that a catalog of individual locations is compiled. Code carriers are affixed to the pieces of furniture, ones which provide indication of the specific location of a given piece of furniture in the building. The data of the catalog of individual locations and the data relating to the specific location of the pieces of furniture are stored in an electronic database as room equipment catalog.

DE 101 45 498 A1 discloses a mobile reading device for reading information relating to processing of silicon disks out of a transponder, the transponder being mounted on a transportation container for silicon disks.

The object of the invention accordingly is to make available a seat which overcomes the disadvantages of the state of the art. In particular, reliable long-term unequivocal identification of the seat and/or the individual seat components is to be made possible and reliable and long-term logging of data relevant to seat or seat component service life and/or certification, along with ease of read-out of such data on the basis of a reading device claimed for the invention, is to be enabled.

This object is attained by the seat claimed in claim 1 and by the reading device claimed in the subordinate claim. Particular configurations of the invention are specified in the dependent claims.

The object is attained with a seat, in particular a vehicle seat, preferably an aircraft passenger seat, having at one seat component, such as a seat element, a backrest, or an arm rest, the seat as delivered having met the requirements of specified approval regulations and accordingly having been certified, in that a data storage device is mounted so as to be stationary on at least one seat component for storage of individual data relating to the service life and/or certification of the respective seat and/or individual seat components, and in that the contents of the data storage device may be read out electronically by an external reading device.

The data storage device is by preference configured as a semiconductor chip and may, for example, have peripheral switching circuits for reception and transmission and for writing and read-out of data. Switching configurations such as are obtainable on the market for other purposes, ones such as SIM (subscriber identify module) cards, SIMM (single inline memory module) cards, or DIMM (dual inline memory) cards are examples of what may also be included. The data preferably are stored in digital form and the data storage device may be in the form of a lifetime card or service-life card for an individual seat. The data preferably are stored in non-volatile form, that is, the data continue to be stored even after the power supply has been switched off.

By preference the configuration of the data storage device or the reception unit associated with the data storage device which is selected is such that data transmission may be established by simple means with a preferably external and in particular mobile reading device. As an alternative or in addition to a mobile reading device, consideration is also given to hardwiring of the seat or associated data storage device, such as connection of the data storage device to a power line or a databus to which the data storage devices of other seats may also be connected. The external reading device may in this case also be connected to the databus and address the data storage devices of individual seats in parallel or sequentially by way of individual memory addresses associated with the respective seat. The data storage device has preferably already been fastened at the factory on the seat or seat component so as to be virtually non-detachable or in any event secured against unauthorized replacement.

In one particular embodiment of the invention the data storage device has a read-only memory area in which data have already been stored at the factory in the seat in the delivery status. By preference data may no longer be added to this area subsequently, that is, after the seat has been delivered. Either a separate semiconductor chip may be provided for this read-only memory area or specific storage address areas may be reserved as read-only memory by hardware or software means. Typical examples of data of this read-only area are item number, serial number, parts list date, approval regulations, first customer, first installation, etc. At least a part of these data may also be summarized in a unique, unchangeable, and electronically readable identification number.

By preference the data storage device has a random access memory (RAM) area into which data may be written and from which data may be read out over the service-life of the seat. The read-out and writing of data may in particular be performed discontinuously, as for example on the occasion of maintenance operations which are executed regularly after a specified number of hours of operation have been completed. Once data have been written into the data storage device they may not be removed from the data storage device; in particular, data once written are non-erasable and non-rewritable. This makes certain that, once data have been written, they may not be manipulated. This can be accomplished by software means, for example, in that each storage address may be used only once for writing and then is no longer available, or by hardware means, in that writing entails irreversible storage processes, such as by melting of connecting lines.

Typical examples of data entered in the random access memory area are the original installation date, the vehicle and operator of the vehicle, in the case of an aircraft passenger seat in particular the aircraft type and the aircraft identification, as well as the airline, the position of the seat inside the vehicle, repairs made, modification of the seat carried out, maintenance work, times in a workshop, and so forth. Every data input may be provided with a permanent date stamp.

As a rule, transmission of data between reading device and data storage device may be effected by conventional means. In particular, it may be wirelined; for example, transmission may be effected by way of a specific or even standardized interface. In one particular embodiment of the invention transmission of data between the data storage device and the reading device is wireless. In particular, data may be read out of the data storage device by wireless means and written into the data storage device by wireless means. Wireless data transmission may be effected by means of electromagnetic waves in the case of an aircraft passenger seat as well, subject to compliance with the applicable stricter safety regulations, and, for example, also by means of optical signal transmission, and optionally also by means of glass fiber which may be introduced into the seat.

By preference the data storage device operates on the transponder principle and is ready only after suitable stimulation of the reading device to data transmission optionally secured by passwords. It is possible, for example, for it to be possible to read the data from the data storage device in that the data storage device or an associated reception unit suitably modifies and quasi modulates a signal emitted from the reading device, for example, by weakening the electromagnetic field in accordance with the stored data. The reading device has a reception unit which receives and more or less demodulates the modified signal and as a result demodulates the data of the data storage device. As a general rule, all known modulation processes, amplitude modulation in particular, may be used in such data transmission.

In one particular embodiment of the invention the energy required for operation of the data storage device may be transmitted from the reading device to the data storage device or to a reception unit connected to the data storage device. The energy transmission preferably is contact-free, for example, is effected by intensive light irradiation, optionally in the infrared region, by production of a locally sufficiently strong electromagnetic field, or the like.

By preference a unit for positioning the reading device is provided on the seat in the area of the data storage device, in particular a stop unit on the reading device operating in conjunction with associated positioning means. Positioning of the reading device, or in particular of an associated reading head of the reading device, may be effected by simple means, for example, on the basis of a plug connection whereby optionally a contact-bound electric connection may be established along with the mechanical positioning. When the reading head or reading device has been plugged in, data transmission is ensured, irrespective of whether it is wirelined or wireless. However, positioning of the reading device is not absolutely necessary; signal transmission may be made possible simply by bringing the reading device near or sweeping it over the data storage device or a receiving unit associated with the data storage device, more or less as in the instance of a magnetic strip reading device.

The positioning unit preferably has a magnet by means of which the reading device may be moved to a specified position in relation to the data storage device. Such a positioning unit based on magnetic force may also be configured so that it remains essentially invisible outside the seat. This effectively precludes unintentional or intentional manipulation of the interface between reading device and data storage device. The person operating the reading device must be instructed about the position of the data storage device or the associated reception unit, optionally by use of inconspicuous marking on the seat.

The reading device has data transmission means for readout of individual data relating to the lifetime or service life or certification of the respective seat and/or individual seat components, as well as storage means for intermediate storage of data read out of the data storage device and/or writing into the data storage device. The reading device preferably is in the form of a portable battery-powered unit. It will be advantageous for many applications for a miniaturized reading head, in the simplest case a connector, to be connected to the reading device itself, for the connection proper to the data storage device. The connection between reading device and reading head may be either wirelined or wireless.

In one particular embodiment the reading device also has a display unit for display of data read out of the data storage device and/or to be written into the data storage device. As a result, plausibility testing of the data, for example, may be carried out directly on site, optionally also by use of corresponding test data stored in the reading device. In addition, data such as that relating to the precise site of installation of an aircraft passenger seat inside an aircraft may be read out of the data storage device and be checked directly on the spot or may be entered into the reading device and then transmitted to the data storage device.

By preference the reading device has positioning means for positioning in relation to the data storage device for the purpose of error-free data transmission and optionally power transmission as well. The positioning means may also be configured as a reading head itself connected to a base element of the reading device, one which, for example, may be introduced into a jack provided on the seat, on the basis of the lock and key principle. As has already been described in connection with the seat, the positioning means may be in the form of mechanical positioning means, optionally by use of a spring-loaded stop unit, or positioning means supported by magnetic force.

The data intermediately stored in the reading device may preferably be transmitted by use of standardized interfaces to a computer for additional processing. The reading device may for this purpose be connectable to a PC (personal computer), for example, by way of an infrared interface, bluetooth interface, or a fire-wire interface. As an alternative or in addition, the reading device itself and/or the additionally processing computer may communicate by way of a data network such as the Internet, with remote computer systems, databases, and ordering or consultation centers.

A seat outfitted as claimed for the invention is clearly marked and identifiable. Replacement part counterfeiting may also be detected, so that the reliability of the seat as a whole is increased. In particular, in comfort seats of expensive design temporary or emerging problems may be recorded in the data storage device, problems such as increase in the current required by actuators which suggest emerging mechanical or electrical problems. Evaluation of the stored data also permits improved product support, to the extent of precautionary ordering of spare parts. The buyer and user of such seats also benefit over the long term because of the improved customer service and product quality and the increased safety.

Other advantages, characteristics, and details of the invention are presented in the dependent claims and the following description, in which several exemplary embodiments will be described in detail. The characteristics referred to in the claims and in the description may be essential for the invention either individually or in any combination.

Figure 2:
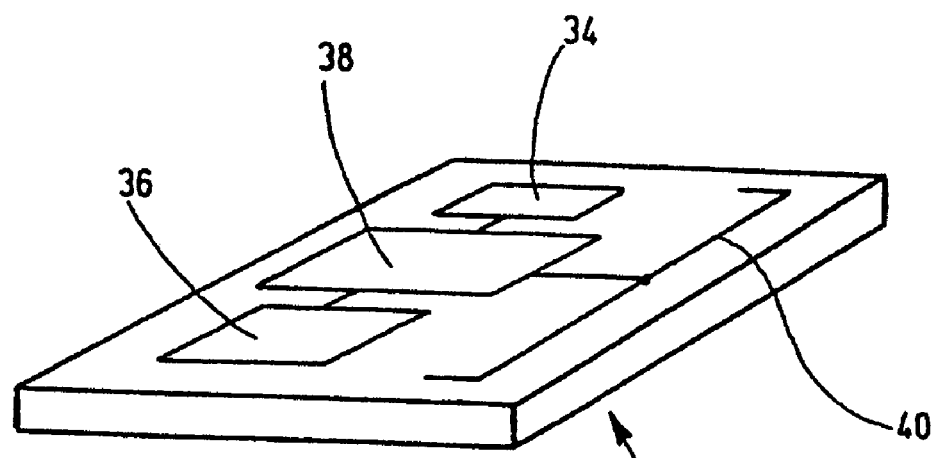
Figure 3:
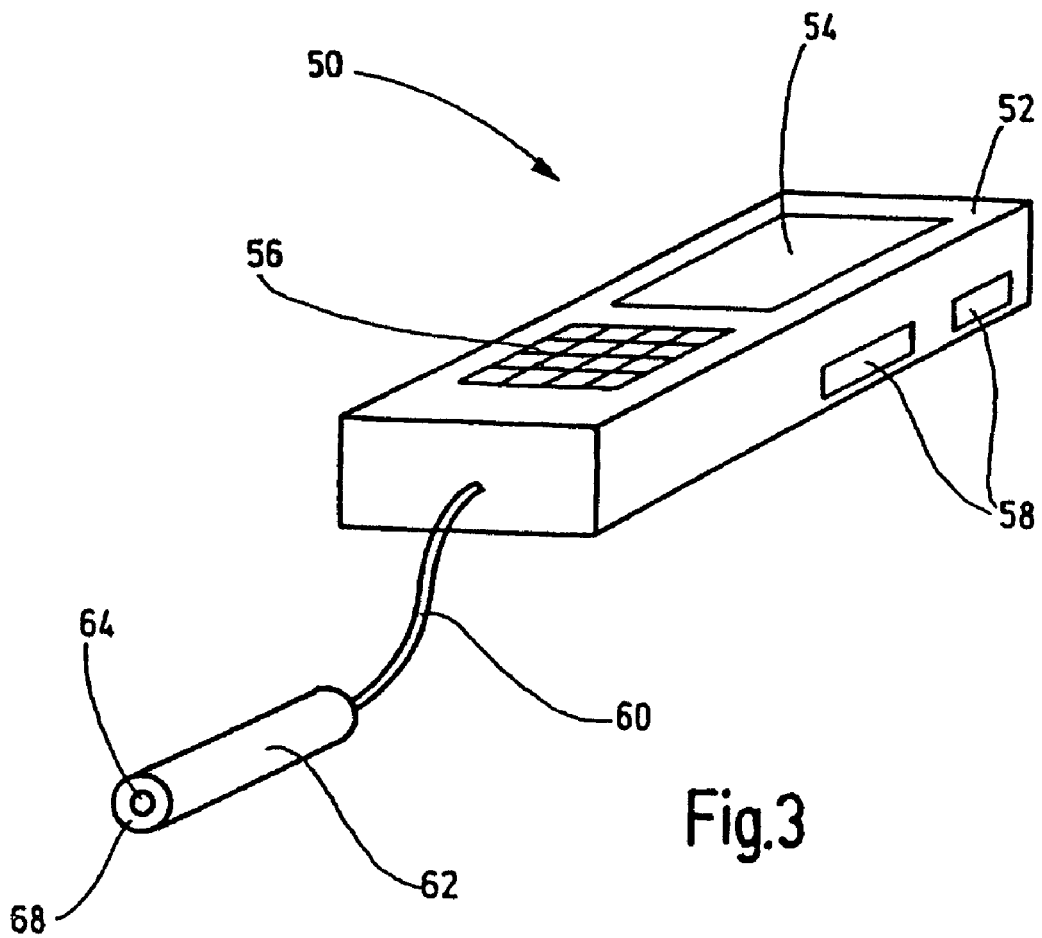

FIG. 1 illustrates an aircraft passenger seat claimed for the invention;

FIG. 2 presents a perspective view in diagram form of a data storage device; and FIG. 3 a perspective view of a reading device claimed for the invention.

FIG. 1 shows an aircraft passenger seat 10 having a seat element 20, a backrest 22, a leg rest 24, and an arm rest 26. The other aircraft passenger seat 30 mounted next to aircraft passenger seat 10 and occupied by a passenger is identical in structure; the corresponding seat components are provided with identical reference numbers. Such aircraft passenger seats 10, 30 are found, for example, in the comfort class of long-distance aircraft. As a rule, however, such seats may also be used in luxuriously outfitted long-distance buses, passenger ships, including ferries, medical facilities, waiting rooms, or the like.

Such seats, especially when used in an aircraft, must meet higher safety requirements and associated approval regulations and must be appropriately certified. Individual seat components may even be required to comply with different approval regulations and, especially in the event of use as a replacement part, to be appropriately certified.

The arm rest 26 of the aircraft seat facing the center aisle has on its front side a three-pole electrical plug socket 12 which is electrically connected to a data storage device mounted in the arm rest 26 and not visible from the outside. The mounting on the arm rest 26 is cited as an example, as is the configuration as three-pole plug. Consequently, the coupling with the reading device may as an alternative or in addition be mounted on another seat component or in another suitable place, such as on a seat divider, seat pedestal, or the like. The plug socket 12 may be replaced by any other element suitable for signal exchange. The data storage device is not otherwise accessible from the exterior and, in particular, has already been integrated into the arm rest 26 at the factory. Data which identify the individual arm rest 26 or the entire aircraft passenger seat 10 have already been entered into the data storage device at the factory. Insertion of a plug of the reading device into the plug socket 12 may be secured for the period of data transmission by means of a clamp carrier (not shown).

The other aircraft passenger seat 30 as well has a plug socket of its own in the appropriate location or the aircraft passenger seat 10 has on the arm rest 26 facing the center aisle another plug socket connected to the data storage device of the other aircraft passenger seat 30. In the latter case the data of the two aircraft passenger seats 10, 30 may be read conveniently from the arm rest 26 facing the center aisle. As an alternative or in addition to the plug socket 12, the data storage devices of the aircraft passenger seat 10, 30 may be connected by a data bus to which all the passenger seats of the respective aircraft are connected. In this way the data of all passenger seats of the aircraft may be read out at a central point.

FIG. 2 presents a perspective view in diagram form of a suitable data storage device 32 having a read-only memory area 34 which is mounted so as to be spatially separated from a random access memory area 36. In addition, the data storage device 32 may have electric contact surfaces on the upper or lower side or on a front side. The data storage device 32 also has a central computing unit 38 capable of performing the function of addressing the storage locations within the storage areas 34, 36, for operation of the interface with the reading device, and optionally for transmission to the databus and the like. An antenna 40 is provided against the event that the data transmission is wireless and/or the data storage device 32 must be supplied with electric energy from the exterior by wireless means.

A digital bit sequence unequivocally identifying the aircraft passenger seat 10 is programmed into the read-only memory area 34 at the factory and so as to be permanent. This sequence is made up, for example, of the article number, the serial number, the number and type of seat components, the approval regulations complied with, the certification document, and the planned location of use and purpose of use. If the data storage device 32 is connected to a central databus, the actual times of occupation, flight lengths, number of takeoffs and landings, and the like may be stored on the basis of the data available in a central computer of the aircraft.

Other information may be added to the random access memory area 36 over the service life of the aircraft passenger seat 10. Examples are data relating to identification of the aircraft on which the aircraft passenger seat 10 has been installed, the precise installation site inside the aircraft, maintenance and repair work performed, changes in the aircraft passenger seat 10, and the like. Storage is effected preferably on the basis of the reading device 50 (FIG. 3), in the context of routine or extraordinary maintenance work, by way of the plug socket 12; data written into the storage area 36 cannot be erased or overwritten.

The data of the random access memory area 36 make it possible in particular to log in relevant service life data or lifetime data seamlessly and make them available for subsequent evaluation. As a result, more reliable data can be established for relevant parameters such as MTBF (mean time between failures), MTBUR (mean time between unscheduled removals), DMC (direct maintenance cost), and the like.

FIG. 3 presents a perspective view of a reading device 50 as claimed for the invention, one which has, in a basic element 52, a battery-operated display unit 54 and input unit 56 such as a keyboard or a so-called touch pad, as well as interfaces 58 for input and output of the data to be written into and read out of the data storage device 32 (not shown in FIG. 3). As an alternative or in addition to the interfaces 58, the reading device 50 may also have replaceable storage means such as semiconductor storage cards, magnet storage cards, or the like.

Also connected to the basic element 52, by way of a connecting line 60, are data transmission means 62 such as a plug fitting into the plug socket 12 of the aircraft passenger seat 10 and, in the exemplary embodiment illustrated, mounted in an essentially cylindrical reading head.

In the area of its contact side which is to face the data storage device 32, in the exemplary embodiment illustrated the front side 64, the reading head has a transmission and reception antenna not visible from the outside. By means of the transmission antenna the reading head can construct an electromagnetic field which may be weakened through appropriate damping by the data storage device in keeping with the data to be read out; the resultant damping is in turn evaluated by the reception antenna and the data to be read out are thus determined. In the case of entry of data into the data storage device 32 the data signal to be stored is modulated on the electromagnet field of the transmission antenna. This data signal is appropriately demodulated by the central computing unit 38 of the data storage device 32 and written into the random access memory area 36.

As a rule, the plug socket 12 of the aircraft passenger seat 10 may be configured so that, as an alternative or in addition, the reading head may also be inserted into an appropriate socket. By preference, of course, the reading head may be brought into contact with or into the vicinity of a coupling area of the arm rest 26 provided for this purpose; this coupling area is indicated by the broken lines in FIG. 1 below the plug socket 12 as a component of the positioning unit 66 to be described below. Approach to within a few centimeters is sufficient to guarantee data transmission between the reading head and the data storage device 32.

It is possible in the process to configure the coupling area by selection of suitable materials, magnetizable ones, for example, as positioning unit 66 for the reading device 50 or reading head. In this instance the reading head may have an annular electromagnet or permanent magnet on its front side 64 as positioning means associated with the positioning unit 66. When such positioning means 68 are activated, the reading head is automatically oriented toward the coupling area after it enters the capture range of the positioning unit 66.

The invention claimed is:

1. A seat having:
   a plurality of seat components;
   a data storage device mounted on one of the seat components and storing relevant data, wherein the relevant data is data that represents at least one of service life of the seat, certification of the seat, service life of one of the seat components, and certification of one of the seat components; and
   an interface by which said relevant data is readable by an external reading device, wherein
   the seat is included in a seat system, which includes a reading device for data transmission to the data storage device, and
   the reading device has data transmission means for reading the relevant data,
   the reading device has storage means for intermediate storage of data read from the data storage device.

2. The seat as claimed in claim 1, wherein the reading device has a display unit for display of the relevant data.

3. The seat as claimed in claim 1, wherein the reading device has positioning means for positioning the reading device in relation to the data storage device for purposes of data transmission.

4. The seat as claimed in claim 1, further comprising a standardized interface for transmitting the relevant data to a computer effecting further processing.

5. The seat as claimed in claim 1, wherein the storage means is provided for intermediate storage of data to be written into the data storage device.

6. A vehicle seat having:
   a plurality of seat component;
   a data storage device mounted in a stationary manner on one of the seat components and storing relevant data, wherein the relevant data is data that represents at least one of service life of the seat, certification of the seat, service life of one of the seat components, and certification of one of the seat components; and
   an interface by which said relevant data is readable by an external reading device, wherein data transmission between the data storage device and the reading device is effected by a wireless device, so that data is read out of the data storage device wirelessly and data is written into the data storage device wirelessly.

7. A vehicle seat having:
   a plurality of seat components;
   a data storage device mounted in a stationary manner on one of the seat components and storing relevant data, wherein the relevant data is data that represents at least one of service life of the seat, certification of the seat, service life of one of the seat components, and certification of one of the seat components; and
   an interface by which said relevant data is readable by an external reading device, wherein transmission of data between the data storage device and the reading device is effected by use of a plug connection.

8. A vehicle seat having:
   a plurality of seat components;
   a data storage device mounted in a stationary manner on one of the seat components and storing relevant data, wherein the relevant data is data that represents at least one of service life of the seat, certification of the seat, service life of one of the seat components, and certification of one of the seat components, wherein the data storage device comprises a transponder, and data are writable to and readable from the data storage device upon appropriate stimulation of an external reading device; and
   an interface by which said relevant data is readable by the external reading device.

9. A vehicle seat having:
   a plurality of seat components;
   a data storage device mounted in a stationary manner on one of the seat components and storing relevant data, wherein the relevant data is data that represents at least one of service life of the seat, certification of the seat, service life of one of the seat components, and certification of one of the seat components;
   an interface by which said relevant data is readable by an external reading device; and
   a positioning unit for positioning the reading device into a specifiable position in relation to the data storage device, wherein the positioning unit has a magnet by which the reading device is placed into said specifiable position.

* * * * *